July 15, 1941.   W. H. NEELY   2,249,031
YIELDING CLIP CONNECTION FOR SPRING SEAT STRUCTURES
Filed Dec. 6, 1938
FIG. 1
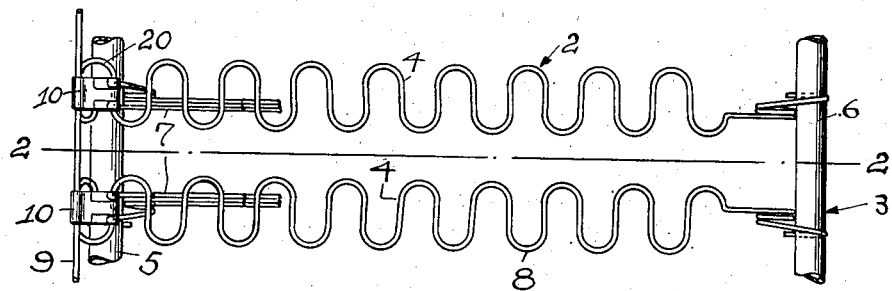
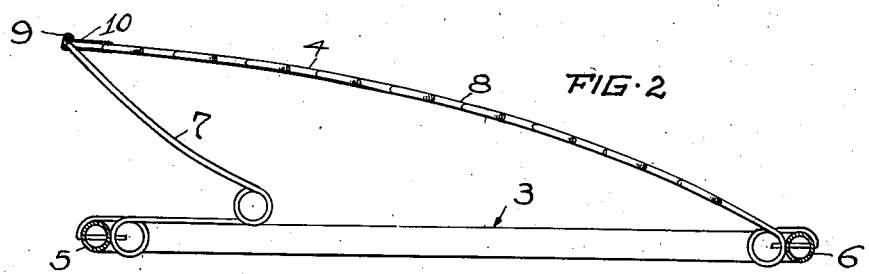
FIG. 2
FIG. 3   FIG. 4   FIG. 5
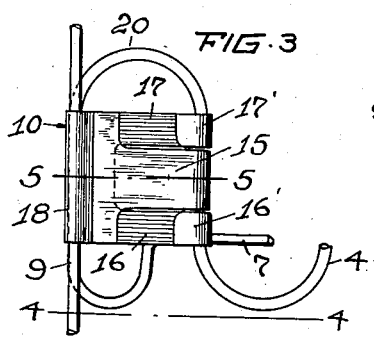 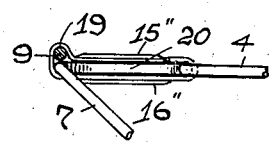 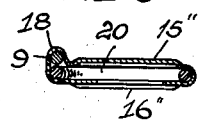
FIG. 6   FIG. 7
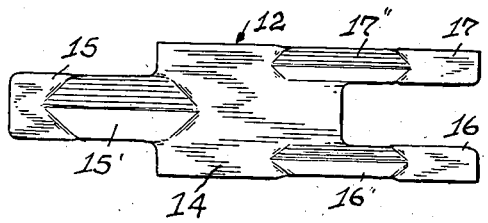 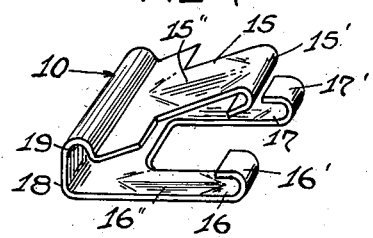
FIG. 8
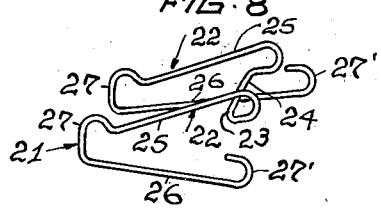
INVENTOR.
WILLIAM H. NEELY
BY Gustav. A. Wolff.
ATTORNEY.

Patented July 15, 1941

2,249,031

UNITED STATES PATENT OFFICE 2,249,031

YIELDING CLIP CONNECTION FOR SPRING SEAT STRUCTURES

William H. Neely, Cleveland, Ohio, assignor, by direct and mesne assignments, to John C. Lincoln, Scottsdale, Ariz.

Application December 6, 1938, Serial No. 244,188

6 Claims. (Cl. 155—179)

This invention relates in general to spring seat structures embodying a plurality of specifically constructed flat springs of sinuous or similar shape, which springs are arranged side by side across a frame and form a continuous, elevated seating portion above the frame. In these spring seat structures the elevated seating portion has its edge commonly reenforced by an edge wire, which wire is attached to and supported by all the springs, prevents individual lateral movements of such springs and stiffens the edge of the seating portion to give said edge the desirable degree of rigidity so as to prevent sagging.

In structures of this type it is desirable that the springs and the edge wire be connected with each other by connecting means permitting of the springs and edge wire having the desired movement in the connecting means without change of their axial relationship to each other to prevent opening up of the connecting means and therewith destruction of the coupling between the springs and the edge wire.

It is the primary object of this invention to provide a simple, economical and positively operating connecting means by which sinuously shaped springs may readily and easily be coupled with an edge wire or similar element in a manner preventing opening up of the connecting means and insuring proper axial relation of the spring and edge wire under all conditions.

Another object of the invention is to provide a connecting means for coupling sinuously shaped springs with an edge wire or similar element, which connecting means can readily and easily be slipped over an edge wire and which yieldingly gripping said wire can readily be sleeved upon one of the loops of a sinuously shaped spring for coupling said wire to said spring.

In addition the invention has certain other marked superiorities which radically distinguish it from presently known structures. These improvements or superior characteristics embodying certain novel features of construction are clearly set forth in the following specification and the appended claims; and a preferred form of embodiment of the invention is hereinafter shown with reference to the accompanying drawing forming part of the specification.

In the drawing:

Fig. 1 shows a plan view of a portion of a spring seat structure embodying flat springs of sinuous shape coupled at their front ends with an edge wire structure by means of connecting clips embodying the invention.

Fig. 2 is a sectional view through Fig. 1, the section being taken on line 2—2 of Fig. 1.

Fig. 3 is an enlarged plan view of the connecting clip coupling a wire to a sinuously shaped spring.

Fig. 4 is a sectional view through Fig. 3, the section being taken on line 4—4 of Fig. 3.

Fig. 5 is a sectional view through Fig. 3, the section being taken on line 5—5 of Fig. 3.

Fig. 6 is a plan view of the blank from which the connecting clip is formed.

Fig. 7 is a perspective view of the finished clip when in opened position; and

Fig. 8 is a perspective view of a somewhat modified form of the clip, the clip being made of spring steel wire.

The invention, having particular application to spring structures of the general character stated above, is illustrated in connection with a fragmentarily shown spring seat structure 2 embodying a frame member 3 supporting a plurality of flat sinuously shaped springs 4 arranged crosswise of the frame and secured to the front and rear rails 5 and 6 thereof. The front ends of springs 4 are formed with rearwardly and downwardly extended lever arms 7 provided with forwardly extended hook-shaped attachment means and the rear ends of the springs are provided with rearwardly extended attachment means, so as to support the seating portion 8 of the spring structure substantially above frame member 3. At the front end each spring is secured to and supports an edge wire 9 by means of a metal clip 10 dimensioned to be readily sleeved upon the front loop 20 of the spring and to yieldingly clamp the edge wire 9 to such spring. This metal clip is formed from a blank 12 of sheet spring steel, see Fig. 6, embodying a central substantially rectangular shaped portion 14 and having extended from one end an elongated finger-like integral extension 15 and from the opposite end two parallelly arranged, spaced elongated finger-like integral extensions 16 and 17. Extension 15 and extensions 16 and 17, spaced from each other the width of extension 15, have their free ends doubled-back to form hook-like members 15', 16' and 17', so related to each other, that the hook-like members 15', 16' and 17' form a rounded continuous end wall for the elongated sleeve-like clip 10, when the central portion 14 of blank 12 is doubled-back upon itself as at 18. The doubled-back portion 18 of blank 12 is preferably formed with a recess 19 to provide sufficient space and a seat for edge wire 9 when the normally open clip 10, see Fig. 7, has been slipped over wire 9 and after being yieldingly forced together for alignment of hook-like members 15', 16' and 17' is forcibly sleeved upon front loop 20 of the respective spring 4.

Clip 10, when forcibly sleeved upon a loop 20, yieldingly grips edge wire 9 and couples the front end of spring 4 and edge wire 9 with each other. An accidental opening of clip 10 is impossible, as hook-like members 15', 16' and 17' are held in alignment by the wire of the loop 20 over which the clip has been sleeved. The yielding grip of clip 10 on edge wire 9 does not decrease when the seating structure is under load, because springs 4 under load stretch and therewith stretch the clip so that the grip of clip 10 on loop 20 and edge wire 9 is increased.

Preferably, as shown, finger-like extensions 15, 16 and 17 include rib-like struck up portions 15", 16" and 17", which portions stiffen said extensions and permit of the clip being more readily gripped and compressed by an operator when the clip is to be forcibly sleeved upon a loop 20 of spring 4. Clips of the type described can readily be used in upright or inverted position to support the edge wire above or below the wire of the loop 20 and of course may be used for any other purpose as for attaching stiffening means to any part of the sinuously shaped portion of springs 4.

In the modified form shown in Fig. 8, the clip 21 is of a type similar to that previously disclosed, however, in this case the clip is made of spring steel wire. Clip 21 embodies two symmetrically constructed portions 22, which portions are integrally connected with each other by a cross member 23 shaped to form with portions 22 a hook-like central member 24. The portions 22 each embody angularly related straight wire portions 25, 26 integrally formed by doubling-back the wire at 27 so as to form a recessed seat for an edge wire and extending the doubled-back portion 26 at a lateral inclination to portions 25 and then forming a hook 27' at the end of portion 26, which hook is inverted with respect to the hook-like central member 24. The action of the described spring steel wire clip is similar to that of the sheet spring steel clip previously described, however, the gripping action is obviously less than the said sheet spring steel clip.

While there are illustrated and described only two particular forms of embodiment of the invention, it should be understood that the invention is not to be limited to these embodiments as the same may be variously modified and altered without departing from the spirit of the invention.

Having thus described my invention, what I claim is:

1. A spring steel clip for attaching a wire element to a sinuously shaped flat spring comprising converging top and bottom members, integral yielding seating and clamping means dimensioned to seat and yieldingly grip a plurality of wires, said seating and clamping means yieldingly connecting the converging ends of said top and bottom members, and a recessed seat in said seating and clamping means, said top and bottom members including integral hook-shaped finger portions extending from the free ends of said top and bottom portions with their hooks inverted with respect to each other.

2. A spring steel clip for attaching a wire element to a sinuously shaped flat spring comprising converging top and bottom portions, integral means yieldingly connecting the converging ends of said top and bottom portions in spaced relation with each other, and a recessed seat in said integral connecting means, said top and bottom portions including hook-shaped extensions with invertedly arranged hooks and said extensions being dimensioned to bring the seats of their hooks into alignment when said top and bottom portions are yieldingly forced toward each other.

3. A spring steel clip for attaching a wire element to a sinuously shaped flat spring comprising converging top and bottom portions integrally connected with each other by a curved portion, a recessed seat for a wire in said curved portion, and integral finger-like extensions on the ends of said top and bottom portions, said extensions being formed with curved hook means having their open ends extended in opposite directions to align said hook means to a continuous seat when said top and bottom portions are yieldingly forced toward each other.

4. A spring steel clip for attaching a wire element to a sinuously shaped, flat spring comprising converging top and bottom portions, integral means yieldingly connecting the converging ends of said top and bottom portions and formed with a recessed, elongated seat for seating and clamping a wire member, and fingerlike, stiffened extensions on the free ends of said top and bottom portions, said extensions having their ends bent inwardly to form open hooks and being arranged alternately from the top and bottom portions in such a manner that all the extensions form a continuous seat for a wire, when said top and bottom portions are yieldingly forced toward each other.

5. In a clip connection the combination of a wire spring having a plurality of loops to form a substantially sinuously shaped, flat spring, a wire member attached to said spring, and an elongated clip attaching said wire member to said spring, said clip being sleeved over one of the loops of said spring and including spaced top and bottom members, connected at their one ends integrally with each other and formed at their connection with a seat for two wires to accommodate the wire of one part of the said one loop and the said wire member, and said top and bottom members being provided at their other ends with co-operating hook-shaped means providing a seat for the wire of the other part of the said one loop.

6. A spring steel clip for attaching a wire element to a sinuously shaped, flat spring comprising an integral spring steel wire bent to form two substantially parallel top members, two bottom members converging laterally and vertically toward said top members, means integrally and yieldingly connecting said top and bottom members formed by bending the wire between each top and bottom members to a curvature including a recessed seat, and co-operating hook-shaped portions extending from the free ends of said top and bottom members with their hooks inverted with respect to each other.

WILLIAM H. NEELY.